US012775728B2

(12) United States Patent
Xu et al.

(10) Patent No.: US 12,775,728 B2
(45) Date of Patent: Oct. 27, 2026

(54) BROWSER EXTENSION TO DETECT CLOUD UPLOADS

(71) Applicant: Capital One Services, LLC, McLean, VA (US)

(72) Inventors: Tao Xu, Clarksburg, MD (US); Krystan R Franzen, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 384 days.

(21) Appl. No.: 18/091,113

(22) Filed: Dec. 29, 2022

(65) Prior Publication Data

US 2024/0220646 A1 Jul. 4, 2024

(51) Int. Cl.
*G06F 21/62* (2013.01)

(52) U.S. Cl.
CPC ................................ *G06F 21/6218* (2013.01)

(58) Field of Classification Search
CPC ................................................... G06F 21/6218
See application file for complete search history.

(56) References Cited

U.S. PATENT DOCUMENTS 8,544,060 B1 * 9/2013 Khetawat ................ H04L 63/20 726/1
9,106,607 B1 * 8/2015 Lepeska .............. H04L 67/5681
10,148,694 B1 * 12/2018 Sarin ....................... H04L 63/14
10,255,445 B1 * 4/2019 Brinskelle ............. G06F 21/606
10,437,791 B1 10/2019 Bebchuk et al.
11,089,064 B1 8/2021 Sarukkai et al.
11,144,671 B1 * 10/2021 Springer ............... H04L 63/108
11,347,205 B2 5/2022 Cella et al.
11,678,010 B1 * 6/2023 Mezzapelle ........ H04N 21/4302 725/38
11,757,934 B1 * 9/2023 Agrawal ............. H04L 63/1466 726/23
2009/0106835 A1 * 4/2009 Corrao ................ G06F 21/6263 726/21
2014/0164257 A1 * 6/2014 Brown ................. G06Q 30/016 705/304
2014/0173726 A1 * 6/2014 Varenhorst .......... H04L 63/1416 726/22
2014/0259190 A1 * 9/2014 Kiang ..................... G06F 21/51 726/30
2014/0304816 A1 * 10/2014 Klein .................... G06F 21/566 726/23
2015/0074820 A1 * 3/2015 Toda ....................... G06F 21/80 726/27

(Continued)

*Primary Examiner* — Jason Chiang
(74) *Attorney, Agent, or Firm* — Bookoff McAndrews, PLLC

(57) ABSTRACT

Disclosed embodiments pertain to protecting sensitive information in an electronic file moving between a web browser and a cloud. A web browser extension associated with a web browser can detect a connection to a cloud service and monitor an electronic file designated by a user to be transferred between the cloud service and the web browser. The browser extension can subsequently detect that the electronic file includes sensitive information and activate a security action to detect the sensitive information. The security action can include, among other things, blocking the transfer, quarantining the file, or requesting the sensitive information be removed or obfuscated.

20 Claims, 6 Drawing Sheets

(56) References Cited

U.S. PATENT DOCUMENTS

| | | | | |
|---|---|---|---|---|
| 2015/0365385 | A1 | 12/2015 | Hore | |
| 2016/0292437 | A1* | 10/2016 | Manmohan | H04L 9/3242 |
| 2018/0027006 | A1 | 1/2018 | Zimmermann et al. | |
| 2019/0138727 | A1 | 5/2019 | Dontov et al. | |
| 2019/0199711 | A1* | 6/2019 | Petrovichev | H04L 63/0869 |
| 2019/0207980 | A1* | 7/2019 | Sarin | G06F 21/85 |
| 2019/0364395 | A1* | 11/2019 | Trojanowski | H04W 4/12 |
| 2020/0242269 | A1* | 7/2020 | Narayanaswamy | G06F 21/55 |
| 2021/0096785 | A1* | 4/2021 | Inoue | G06F 3/1231 |
| 2021/0110059 | A1* | 4/2021 | Kaul | G06F 11/302 |
| 2022/0046059 | A1 | 2/2022 | Pandurangi et al. | |
| 2022/0116397 | A1 | 4/2022 | Deshmukh et al. | |
| 2022/0217133 | A1* | 7/2022 | Montgomery | H04L 63/0823 |
| 2022/0244855 | A1* | 8/2022 | Botelho | G06F 16/2379 |
| 2022/0382902 | A1* | 12/2022 | Panikkar | G06F 21/6245 |
| 2022/0405937 | A1* | 12/2022 | Sodani | G06T 7/11 |
| 2023/0076870 | A1* | 3/2023 | Arnold | G06F 21/604 |
| 2023/0095155 | A1* | 3/2023 | Bresloff | G06N 7/01 726/27 |
| 2023/0370434 | A1* | 11/2023 | Nadir | H04L 63/20 |
| 2023/0388347 | A1* | 11/2023 | Berko | H04L 63/104 |
| 2024/0061952 | A1* | 2/2024 | Kwok | G06F 21/6245 |
| 2024/0062569 | A1* | 2/2024 | Mittal | G06V 10/82 |
| 2024/0070295 | A1* | 2/2024 | Kwok | G06F 21/602 |
| 2024/0119170 | A1* | 4/2024 | Xu | G06F 40/295 |

* cited by examiner

BROWSER EXTENSION TO DETECT CLOUD UPLOADS

BACKGROUND

Users may accidentally download or upload sensitive information such as personally identifiable information (PII) when using cloud-based applications on a user device. For example, customers and/or agents of financial institutions have both been found prone to upload documents containing social security numbers (SSNs) and credit card numbers into the cloud via a cloud application that includes an automatic upload feature. When uploaded to a cloud, unmasked sensitive information may end up being transmitted unprotected without proper encryption and may not be properly encrypted and stored. This may violate federal and international regulations requiring sensitive information and PII to be properly transmitted and stored with adequate safety measures taken. When an organization violates one or more regulations, that organization may suffer from a damaged reputation. If an organization is known by the public to violate regulations regarding the proper handling of sensitive information and PII, that organization may suffer from public trust and eventually lose economically from the loss of business from a reduced customer base.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

A computer-implemented method (and system) protects sensitive information in an electronic file transferring or moving between a web browser and a cloud. The computer-implemented method includes displaying a web browser on a computer display that permits a user to connect to and communicate with a cloud. The method detects, with a browser extension associated with the web browser, navigation to the cloud. The method monitors, with the browser extension, at least one electronic file that is moving between the cloud and the web browser. The method detects that the electronic file includes sensitive information. The method provides, via the browser extension, a warning to a user of the web browser that sensitive information has been moved between the cloud and the web browser.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

BRIEF DESCRIPTION OF THE DRAWINGS

The accompanying drawings, which are incorporated in and constitute a part of the specification, illustrate various example methods and other example configurations of various aspects of the claimed subject matter. It will be appreciated that the illustrated element boundaries (e.g., boxes, groups of boxes, or other shapes) in the figures represent one example of the boundaries. It is appreciated that in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
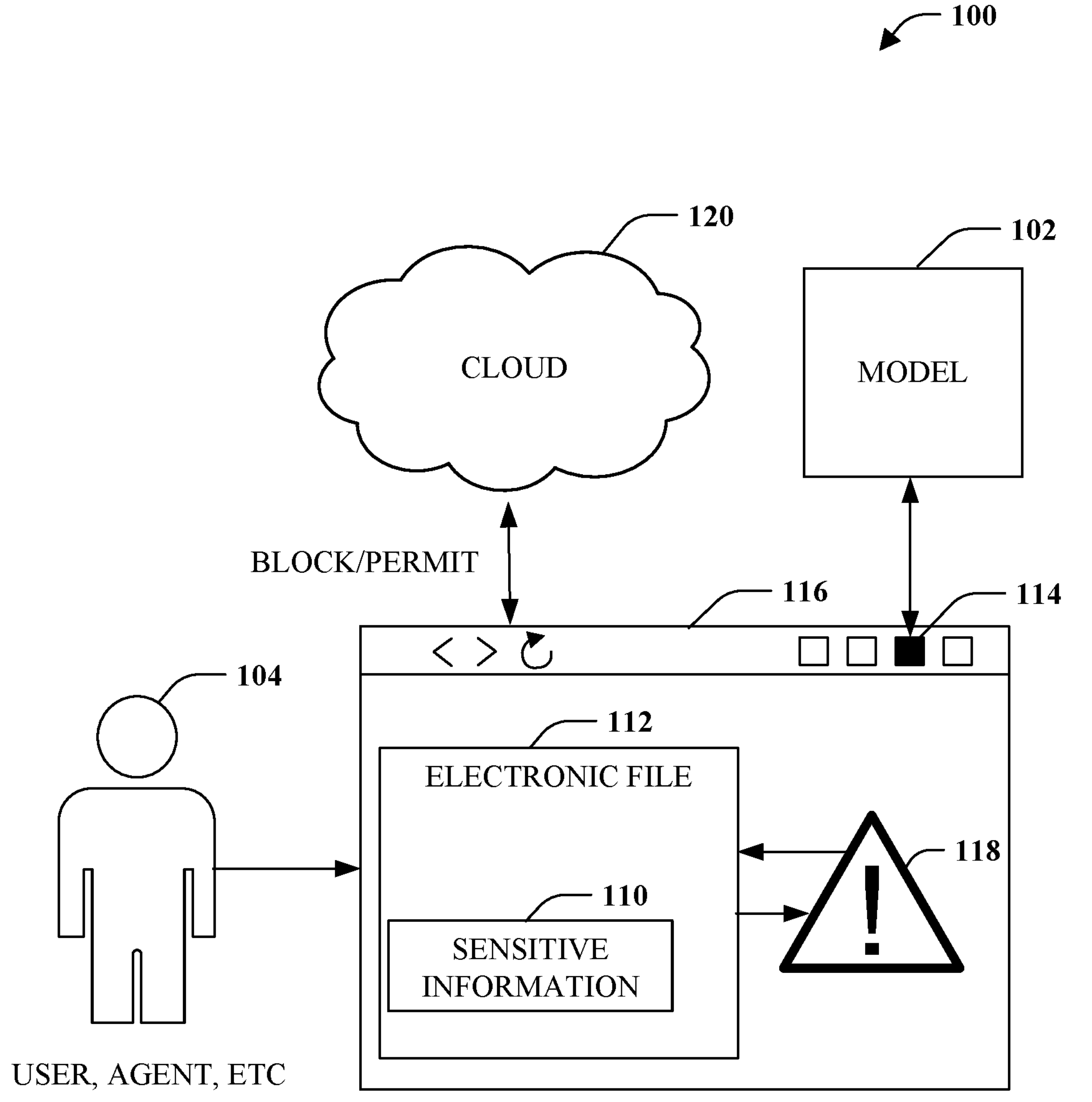
FIG. 1 illustrates an overview of an example implementation of a system that monitors and detects sensitive information being transferred to/from a cloud.

Improperly stored, highly-sensitive human data comes from multiple origin sources (e.g., agents, customers, engineers, and third parties). Preferably, it is desirable to capture where sensitive information originates to prevent sensitive information from entering a computer system/network as early as possible to allow for efficient remediation of incorrectly entered and/or unintended transfer of sensitive information as early as possible. For instance, a request to save data to cloud storage can be intercepted and blocked if sensitive information is present. Preventing the sensitive data from entering a cloud alleviates later remediation of incorrectly entered sensitive information.

Browser extensions customized to monitor, identify and detect sensitive information at its source in real-time may prevent a later need to remediate incorrectly uploaded sensitive information that is ultimately saved into the cloud. In one example configuration, browser extensions may use a machine learning model on the edge to detect certain types of sensitive data/information and alert the user for review/remediation. This solution may feature real-time and automated prevention of transmission of sensitive information from upload to the cloud. The machine learning model can consider and employ context in free-form notes (i.e., unstructured data), thereby reducing false positives that could happen if using detection through conventional expression rules/logic. The user interface empowers the user to remediate and move forward responsibly and, in some instances, may provide an opportunity for the user to also provide feedback if the detected finding is inaccurate. This federated machine-learning model helps improve the accuracy of the model, thereby mitigating sensitive information flow through the wire. The user interface may be a coaching mechanism that influences behavior to mitigate and/or prevent future mistakes.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

'Processor' and 'Logic', as used herein, include but are not limited to hardware, firmware, software, and/or combinations of each to perform a function(s) or an action(s) and/or to cause a function or action from another logic, method, and/or system to be performed. For example, based on a desired application or need, the logic and/or the processor may include a software-controlled microprocessor, discrete logic, an application specific integrated circuit (ASIC), a programmed logic device, a memory device containing instructions, or the like. The logic and/or the processor may include one or more physical gates, combinations of gates, or other circuit components. The logic and/or the processor may also be fully embodied as software. Where multiple logics and/or processors are described, it may be possible to incorporate the multiple logics and/or processors into one physical logic (or processor). Similarly, where a single logic and/or processor is described, it may be possible to distribute that single logic and/or processor between multiple physical logic and/or processors.

FIG. 1 illustrates a high-level overview of an example implementation of a system 100 that monitors for and detects, in real-time, sensitive information 110 (e.g., sensitive data) in electronic data 112 uploaded to a cloud 120 and effects remediation of detected sensitive information 110. The system 100 includes aspects for leveraging user input in a web browser 116 to inform a machine learning model 102 for reducing false positives. A browser extension 114 invokes and uses a machine learning model 102 on the edge to detect certain types of sensitive information 110 and alerts a user 104 for review and remediation. The system 100 features real-time (or near real-time) correction of incorrect attempts to download or upload sensitive information to or from the cloud 120 and the automated prevention of transmission of the sensitive information 110 from spreading further downstream.

In an example, the user 104 inputs an electronic file 112 that may include sensitive information 110 that may be communicated to and from the cloud 120 by the web browser 116. Prior to or simultaneously with the upload of the data, the browser extension 114 engages the machine learning model 102 to monitor the upload of the electronic file 112 to detect if sensitive information 110 is being uploaded in accordance with acceptable standards. To detect if sensitive information 110 is being uploaded, the machine learning model 102 may consider a context in free-form notes (i.e., unstructured data) by detecting sensitive information 110 using regular expression rules/logic.

When the machine learning model 102 detects sensitive information possibly being uploaded, the browser extension 114 may display (or otherwise transmit), in real-time (or near real-time), a warning 118 to the user 104 to indicate sensitive information 110 may be present in the upload. In some instances, the browser extension 114 may prevent the upload or input of further data until the sensitive information 110 is remedied. In some configurations, the browser extension 114 may allow the user 104 to override the warning 118 by indicating or verifying that there actually is not any sensitive information in the electronic file 112. In this case, the machine learning model 102 may be trained with this information.

This federated machine-learning model helps improve the accuracy of the model without having any sensitive information flow through the wire or being transmitted to the cloud (or otherwise). The user interface can be a coaching mechanism that influences behavior and mitigates/prevents future mistakes. Identifying and detecting sensitive information that is incorrectly uploaded in this way and having the sensitive information handled properly before it is stored and/or encrypted avoids violating company policies and/or national and international regulations protecting the safe handling of sensitive information. It will be appreciated that it is much better to correct and find sensitive information early and properly contain, redact, obscure, or delete the sensitive information early rather than after it makes its way into a data system, whereby it can be vulnerable to getting into the wrong hands.

Figure 2:
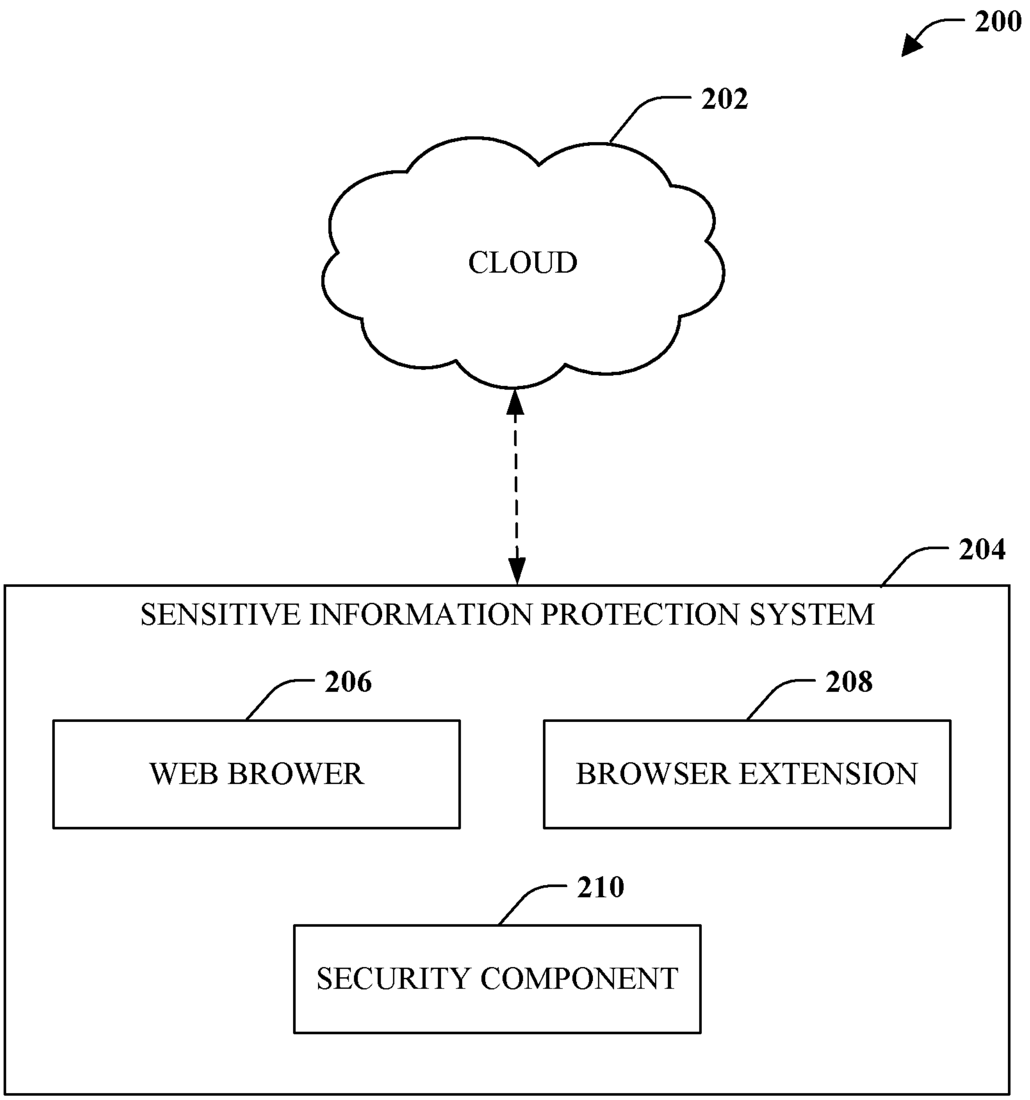
FIG. 2 is a block diagram of a sensitive information protection system in accordance with aspects of the innovation.

FIG. 2 illustrates an example system 200, that protects sensitive information. The example system 200 employs and includes a browser extension that may be on the edge to detect certain types of sensitive data/information and alert the end-user for review/remediation. This example system 200 may feature real-time and automated prevention of transmission of sensitive information from spreading to the cloud 202. The example system 200 includes an example sensitive information protection system 204. The example sensitive information protection system 204 includes a web browser 206, a browser extension 208, and a security component 210.

The web browser 206 provides a way for a user to access internet websites, web-based applications, cloud services/computing/data, and/or the like and have it displayed or rendered on a display device of an electronic device. As will be understood, the sensitive information protection system 204 monitors, identifies, and secures data to and from electronic computing devices. The web browser 206 may further allow the user to access and display a web-based electronic file through the web browser. The web browser 206 may further allow the user to enter data, including sensitive information in the electronic file.

Once a cloud 202 or cloud solution is accessed, the browser extension 208 activates to monitor data and sensitive information being downloaded and/or uploaded between the electronic device and the cloud 202. In some instances, the browser extension 208 activates to monitor data and sensitive information entered into the electronic file. In other configurations, the browser extension 208 activates the browser extension 208 to monitor data and sensitive information being downloaded and/or uploaded between the electronic device and the cloud. If the browser extension 208 detects sensitive information in the electronic file as the browser extension 208 is monitoring the electronic file, the browser extension 208 may quarantine or otherwise obscure/redact the sensitive information and associated data to mitigate inadvertent transmission of the sensitive information to/from the cloud 202.

The browser extension 208 will check the sensitive information and its associated data (e.g., data on both sides of the sensitive information) to be sure the sensitive information is not passed to the cloud 202. The browser extension 208 uses this information and performs a regular expression analysis of the sensitive information to determine if the sensitive information was entered correctly. In one example, the browser extension 208 may consider the context in free-form notes (i.e., unstructured data), reducing false positives that could happen if using detection through regular expression rules/logic.

In general, regular expressions generally use a compact notation to describe a set of strings that make up a regular language. Regular expressions are a precise way of specifying a pattern that applies to all members of a set and may be particularly useful when the set has many elements. Regular expressions work on the principle of providing characters that need to be matched. For example, the regular expression cat would match the consecutive characters c-a-t. Regular expressions may be useful to programmers and can be used for a variety of tasks: (1) searching for strings, e.g., the word 'needle' in a large document about haystacks, (2) implementing a 'find and replace' function that locates a group of characters and replaces them with another group, and (3) validating user input, e.g., email addresses or passwords. A regular language can be defined as any language that can be expressed with a regular expression.

When the browser extension 208 detects that sensitive information has been or is about to be downloaded or uploaded to the cloud, the detection is passed to the security component 210. For example, a user can issue an instruction or request to upload or download from the cloud. However, the browser extension can intercept the request and analyze the information subject to the operations to detect when sensitive information is involved. The security component 210 uses this information to request (and often require) that the user (or agent) rectify the sensitive information that was inadvertently or incorrectly downloaded or uploaded. The request may be in the form of a text box that pops up near where the sensitive information was incorrectly entered, explaining why the information was incorrectly entered and how to correctly re-enter that sensitive information (e.g., in accordance with a regulation or policy). Alternatively, the security component 210 may invoke a chat box to pop up and guide the user as to how to prevent sharing the sensitive information. In other alternatives, the security component 210 may cause other visual or audible notifications. For example, lights may flash, or objects within the electronic file may flash or change colors to indicate sensitive information has been incorrectly downloaded or uploaded. Additionally, the security component 210 may cause audible sounds such as alarms or beeping noises to be activated or other sounds to be activated when sensitive information has been incorrectly downloaded or uploaded. In some configurations, the security component 210 may prevent the entering of any further data until a correction is detected or determined by the browser extension 208.

In some configurations, the security component 210 may provide a way for the user or customer agent to override a browser extension 208 determination that sensitive information has been improperly downloaded or uploaded to or from the cloud. When this occurs, this override information may be provided to the browser extension 208 so that the browser extension 208 may be trained on this information to allow the machine-learning model to make better future predictions of sensitive information being improperly downloaded or uploaded. Providing feedback leverages human input in the browser to inform the browser extension 208 to reduce false positives in the future.

A browser with the browser extension 208 empowers the user to remediate and move forward responsibly and provides an opportunity for the end user to also provide feedback if the detected finding is inaccurate. This federated machine-learning model helps improve the accuracy of the model without having unmasked sensitive information flow external from the example sensitive information protection system 204. In some embodiments, the browser extension 208 may provide a coaching mechanism that influences behavior and prevents future mistakes and/or inadvertent transmission of sensitive data.

Figure 3:
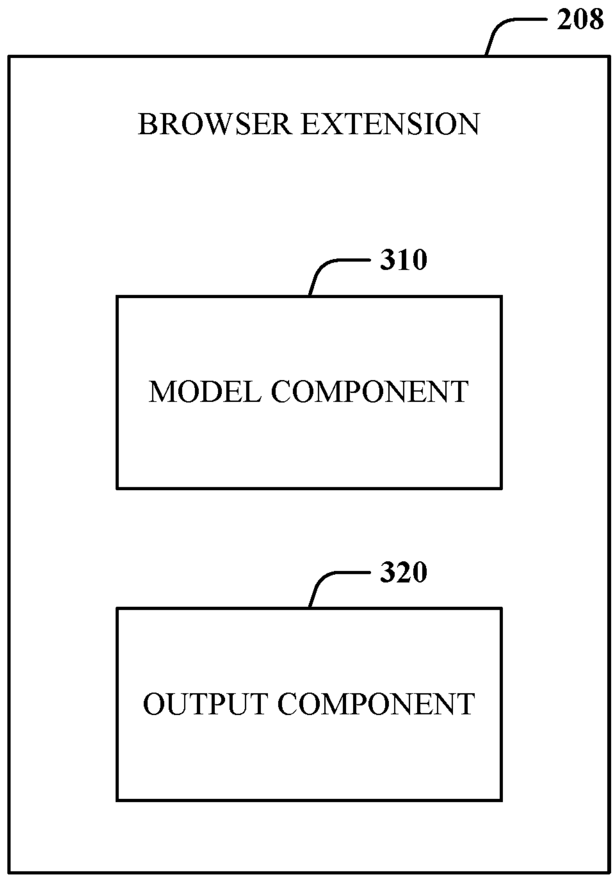
FIG. 3 is a block diagram of a browser extension in accordance with aspects of the innovation.

FIG. 3 illustrates an example component diagram of the browser extension 208. As illustrated, the browser extension 208 includes a model component 310 and an output component 320. The model component 310 can analyze or monitor connections between the browser and the cloud and/or network. In some embodiments, the model component 310 can analyze the connections according to a trained information model. In some embodiments, the information model can be trained via a machine learning technique and a plurality of electronic files. In some embodiments, the plurality of electronic files can include files that have been classified as including sensitive information and files that do not include sensitive information.

The model component 310 can train an information model with the plurality of electronic files. In some embodiments, the model component 310 can retrieve the plurality of electronic files from a financial institution. The model component 310 can interface with a server of the financial institution to retrieve plurality of electronic files as a training dataset (as illustrated in FIG. 1). The output component 320 can invoke the information model to determine the likelihood that an electronic file includes sensitive information. The output component 320 can, via the information model, output a likelihood that an electronic file contains sensitive information in real-time or near real-time or based on detecting that an electronic file is being uploaded or downloaded from the cloud.

In some aspects, this likelihood can be based upon a predefined or predetermined threshold. In other aspects, the threshold(s) can be data-dependent based upon factors commensurate to the type(s) of data. In other words, a telephone number may have a different threshold of sensitivity determination than a social security number or financial account number, for example.

The model component 310 can train the information model via the plurality of electronic files via the machine learning technique. The model component 310 can utilize a machine learning technique to determine trends between electronic files and breaches in sensitive information by the user or a plurality of users. The model component 310 learns from existing data to make predictions (and determinations) about electronic files being moved between the cloud and the electronic device. The model component 310 builds the information model from the electronic files and/or the breach history (e.g., "training data set") in order to make data-driven predictions or decisions expressed as outputs or assessments for the user. The model component 310 can determine the trends and/or correlations within the breach history. For example, the information model can factor in common file names, extensions, bytes, or packets that typically include sensitive information. In some embodiments, the model component 310 utilizes the machine learning technique to analyze the breach history across different users of financial institutions and/or the like to determine an information model based on correlations in the breach history from the financial institution.

The output component 320 can apply the information model to a present electronic file that is being uploaded or downloaded to determine a recommendation or likelihood based on the trends revealed by the machine learning and the breach history. The output component 320 via the information model can determine an output as a percentage likelihood.

In other configurations, the output component 320 may also receive other information associated with the user, user device, and/or sensitive information. The other information can include user behavior data, user data, metadata, an IP (internet protocol) address, other contextual data, and/or the like. The other information may be input into the information model or be used by the model component 310 to train the information model on an ongoing basis. All of the other information can be information useful to the output component 320 for detecting sensitive information. For example, an originating source IP address or a device type data when the data can be captured may also be used by the information model to examine and make a determination if sensitive information is present in the electronic file. For example, an electronic file that is downloaded from an IP address that is known to provide sensitive information can train the information model to increase the likelihood or probability that files from the IP address contain sensitive information.

In some embodiments, the model component 310 can train the information model on the data discussed above for detecting sensitive information and producing a confidence value associated with found sensitive information. The output component 320, via invoking the information model, may output what it considers sensitive information that may need to be redacted as indicated by the sensitive information incorrectly downloaded or uploaded. The information model also outputs a confidence value/risk score that indicates how confident the information model is that the sensitive information is indeed sensitive information. Based on the confidence value, a user may manually check (or verify) the sensitive information and accept or reject if this actually is sensitive information that needs to be redacted.

Figure 4:
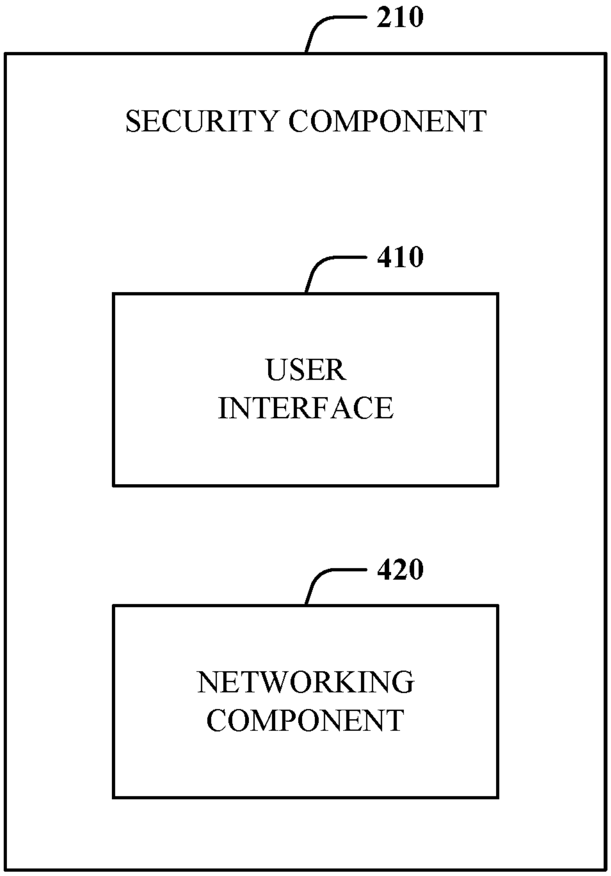
FIG. 4 is a block diagram of a security component in accordance with aspects of the innovation.

FIG. 4 illustrates an example component diagram of a security component 210. The security component 210 can include a user interface 410. The user interface 410 uses detection of sensitive information download or upload to request that the user rectify the sensitive information that was incorrectly or inadvertently downloaded or uploaded. In some aspects, the request may be a text box that pops up near where the sensitive information was incorrectly entered, explaining why the information is incorrectly downloaded or uploaded. Alternatively, the user interface 410 may invoke a chat box to pop up and guide the user as to how to correctly enter (or obscure/redact) the sensitive information. In other alternatives, the user interface 410 may cause lights to flash, and/or objects within the electronic file may flash or change colors to indicate sensitive information has been incorrectly or inadvertently downloaded or uploaded. Additionally, the user interface 410 may cause audible sounds, such as an alarm or beeping noises, to be activated or other sounds to be activated when action should be taken in view of detected sensitive information. In some configurations, the user interface 410 may prevent the entering of any further data until a current sensitive information entry is corrected. In some embodiments, the user interface 410 can quarantine the electronic file such that the electronic file cannot be opened. In other embodiments, the user interface 410 can restrict access to the electronic file to protect the sensitive information. For example, the user interface 410 can impose a password unique to the sensitive information to ensure the owner of the sensitive information (or others with requisite authorization(s)) is the only person that can open the electronic file.

The security component 210 can include a networking component 420. The networking component 420 can adapt the network connection between the electronic device and the cloud based on detection of a sensitive information download or upload. The networking component 420 can adapt the network connection by implementing a timeout during which uploads and/or downloads are prevented. In other embodiments, the networking component 420 can sever a connection between the web browser and the cloud to prevent any subsequent downloads or uploads. In another embodiment, the networking component 420 can escalate monitoring of the connection between the web browser and the cloud.

Figure 5:
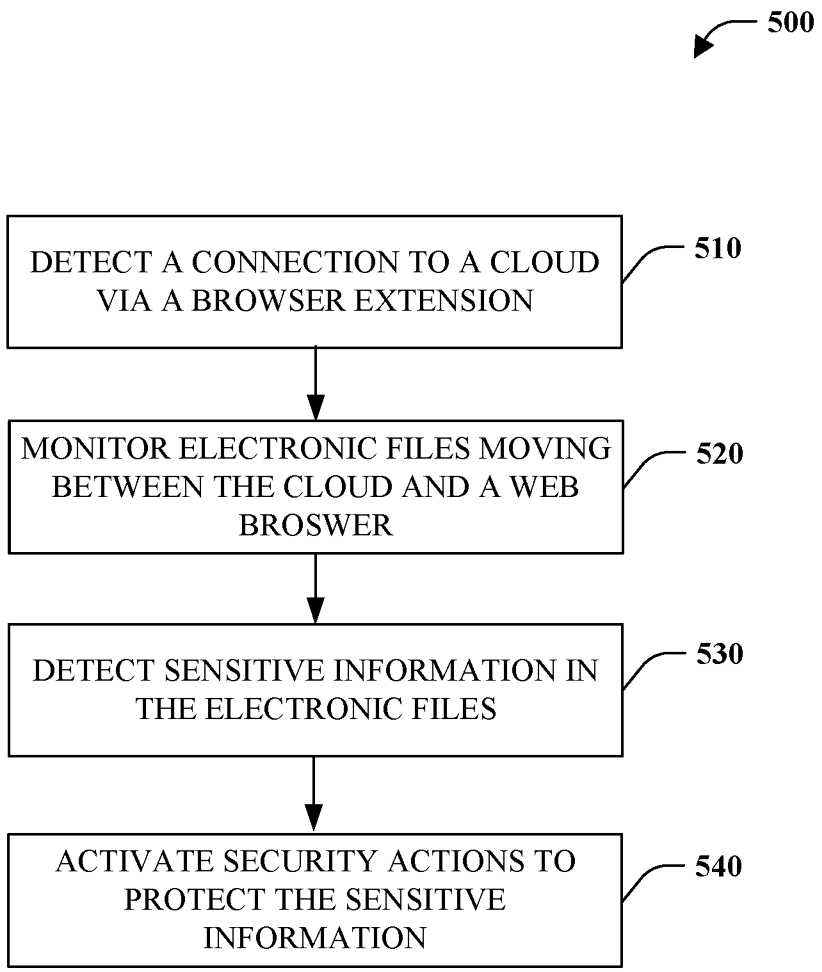
FIG. 5 is a flow chart diagram of a method of sensitive information detection, protection and remediation in accordance with aspects of the innovation.

In view of the example systems described above, methods that may be implemented in accordance with the disclosed subject matter will be better appreciated with reference to flow chart diagrams of FIG. 5. While for purposes of simplicity of explanation, the methods are shown and described as a series of blocks, it is to be understood and appreciated that the disclosed subject matter is not limited by order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Turning attention to FIG. 5, a method 500 of sensitive information protection is depicted in accordance with one or more aspects of this disclosure. The method 500 for protecting sensitive information may execute instructions on a processor that cause the processor to perform operations associated with the method.

At step 510, the method 500 detects, with a browser extension associated with a web browser, a connection to a cloud or cloud service. The browser extension 114 can detect that the web browser is navigating to the cloud via a recognized IP address, website address, application activation, and/or the like. At step 520, the method 500 can monitor, with the browser extension, at least one electronic file designated for transfer between the cloud and the web browser. The browser extension 114 can monitor the connection over a network between the web browser and the cloud. In some embodiments, the browser extension 114 can monitor packets transferring between the web browser and the cloud and recognize packets as part of an electronic file.

At step 530, the method 500 detects that the electronic file includes sensitive information. The browser extension 114 can detect sensitive information by invoking an information model to determine a likelihood that the electronic file includes sensitive information. At step 540, the method 500 activates security controls to protect the sensitive information. For example, the browser extension 114 can provide a warning to a user of the web browser that sensitive information has been moved between the cloud and the web browser. Additionally, as described above, the system can obscure or redact information so as to comply with applicable regulations and/or policies.

As used herein, the terms "component" and "system," as well as various forms thereof (e.g., components, systems, sub-systems), are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 6:
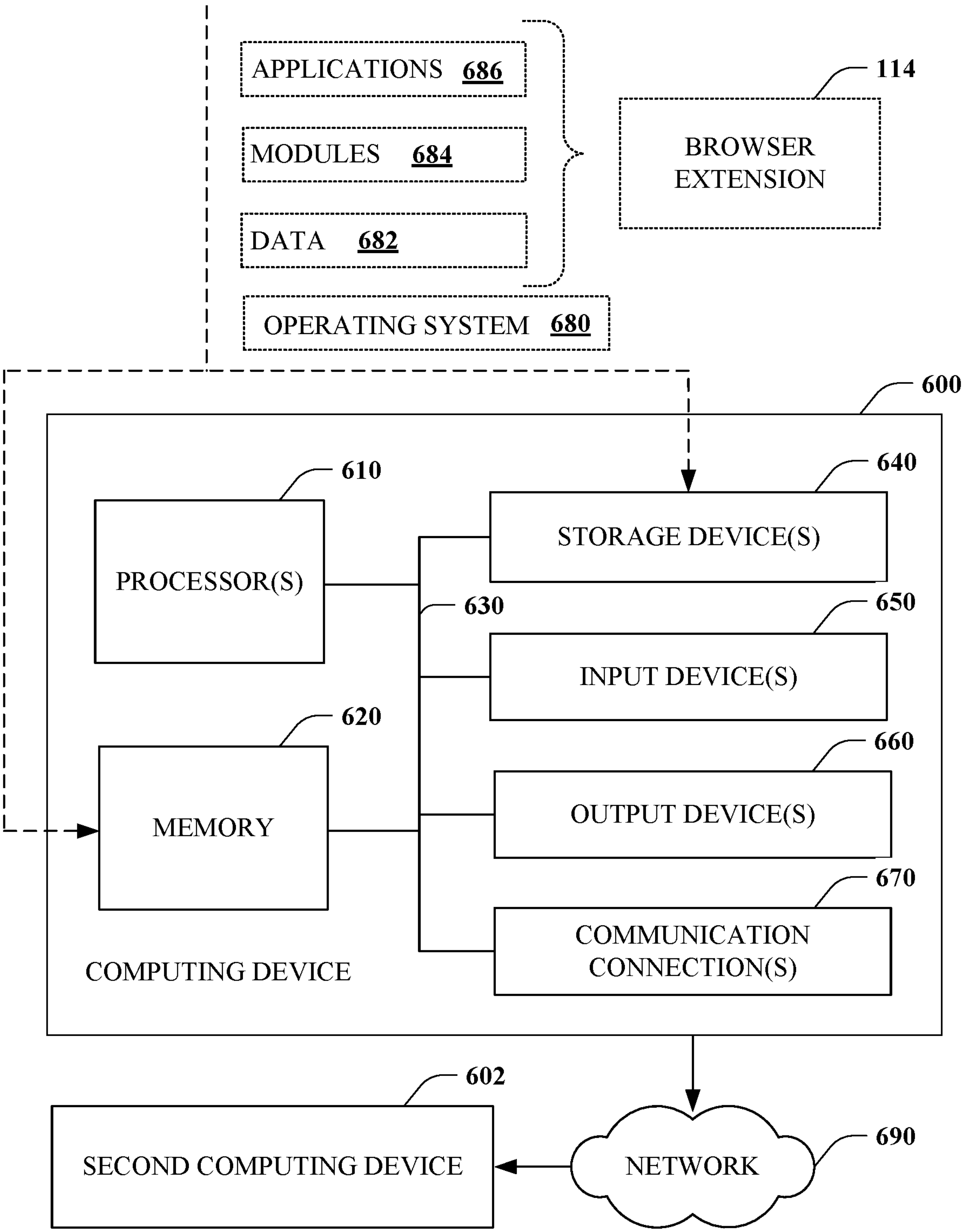
FIG. 6 is a block diagram illustrating a suitable operating environment for aspects of the subject disclosure.

To provide a context for the disclosed subject matter, FIG. 6, as well as the following discussion, are intended to provide a brief, general description of a suitable environment in which various aspects of the disclosed subject matter can be implemented. However, the suitable environment is solely an example and is not intended to suggest any limitation on the scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, and data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all, aspects of the disclosed subject matter can be practiced on stand-alone computers. In a distributed computing environment, program modules may be located in one or both of local and remote memory devices.

With reference to FIG. 6, illustrated is an example computing device 600 (e.g., desktop, laptop, tablet, watch, server, hand-held, programmable consumer or industrial electronics, set-top box, game system, compute node, . . . ). The computing device 600 includes one or more processor(s) 610, memory 620, system bus 630, storage device(s) 640, input device(s) 650, output device(s) 660, and communications connection(s) 670. The system bus 630 communicatively couples at least the above system constituents. However, the computing device 600, in its simplest form, can include one or more processors 610 coupled to memory 620, wherein the one or more processors 610 execute various computer-executable actions, instructions, and or components stored in the memory 620.

The processor(s) 610 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 610 may also be implemented as a combination of computing devices, for example, a combination of a DSP and a microprocessor, a plurality of microprocessors, multi-core processors, one or more microprocessors in conjunction with a DSP core, or any other such configuration. In one configuration, the processor(s) 610 can be a graphics processor unit (GPU) that performs calculations concerning digital image processing and computer graphics.

The computing device 600 can include or otherwise interact with a variety of computer-readable media to facilitate control of the computing device to implement one or more aspects of the disclosed subject matter. The computer-readable media can be any available media accessible to the computing device 600 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 600. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 620 and storage device(s) 640 are examples of computer-readable storage media. Depending on the configuration and type of computing device, the memory 620 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 600, such as during start-up, can be stored in non-volatile memory, while volatile memory can act as external cache memory to facilitate processing by the processor(s) 610, among other things.

The storage device(s) 640 include removable/non-removable, volatile/non-volatile storage media for storage of vast amounts of data relative to the memory 620. For example, storage device(s) 640 include, but are not limited to, one or more devices such as a magnetic or optical disk drive, floppy disk drive, flash memory, solid-state drive, or memory stick.

Memory 620 and storage device(s) 640 can include, or have stored therein, operating system 680, one or more applications 686, one or more program modules 684, and data 682. The operating system 680 acts to control and allocate resources of the computing device 600. Applications 686 include one or both of system and application software and can exploit management of resources by the operating system 680 through program modules 684 and data 682 stored in the memory 620 and/or storage device(s) 640 to perform one or more actions. Accordingly, applications 686 can turn a general-purpose computer 600 into a specialized machine in accordance with the logic provided thereby.

All or portions of the disclosed subject matter can be implemented using standard programming and/or engineering techniques to produce software, firmware, hardware, or any combination thereof to control the computing device 600 to realize the disclosed functionality. By way of example and not limitation, all or portions of the browser extension 114 can be, or form part of, the application 686, and include one or more program modules 684 and data 682 stored in memory and/or storage device(s) 640 whose functionality can be realized when executed by one or more processor(s) 610.

In accordance with one particular configuration, the processor(s) 610 can correspond to a system on a chip (SOC) or like architecture including, or in other words integrating, both hardware and software on a single integrated circuit substrate. Here, the processor(s) 610 can include one or more processors as well as memory at least similar to the processor(s) 610 and memory 620, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the browser extension 114 and/or functionality associated therewith can be embedded within hardware in a SOC architecture.

The input device(s) 650 and output device(s) 660 can be communicatively coupled to the computing device 600. By way of example, the input device(s) 650 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 660, by way of example, can correspond to a display device (e.g., liquid crystal display (LCD), light emitting diode (LED), plasma, organic light-emitting diode display (OLED)), speakers, voice user interface system, printer, and vibration motor, among other things. The input device(s) 650 and output device(s) 660 can be connected to the computing device 600 by way of wired connection (e.g., bus), wireless connection (e.g., Wi-Fi, Bluetooth), or a combination thereof.

The computing device 600 can also include communication connection(s) 670 to enable communication with at least a second computing device 602 utilizing a network 690. The communication connection(s) 670 can include wired or wireless communication mechanisms to support network communication. The network 690 can correspond to a local area network (LAN) or a wide area network (WAN) such as the Internet. The second computing device 602 can be another processor-based device with which the computing device 600 can interact. In one instance, the computing device 600 can execute a browser extension 114 for a first function, and the second computing device 602 can execute a browser extension 114 for a second function in a distributed processing environment. Further, the second computing device can provide a network-accessible service that stores source code, and encryption keys, among other things, that can be employed by the browser extension 114 executing on the computing device 600.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of protecting sensitive information, comprising:

executing on a processor, instructions that cause the processor to perform operations associated with protecting the sensitive information, the operations comprising:

detecting, with a browser extension associated with a web browser, a connection to a cloud service;

monitoring, with the browser extension, at least one electronic file that is designated by a user to be transferred between the cloud service and the web browser;

detecting, via a federated machine learning model, that the at least one electronic file includes the sensitive information by considering unstructured data associated with the at least one electronic file; and activating, via the browser extension, a security action to protect the sensitive information, the security action comprising automatically severing the connection to the cloud service upon detecting that the at least one electronic file includes the sensitive information.

2. The method of claim 1, the operations further comprising invoking an information model to detect if the at least one electronic file includes the sensitive information.

3. The method of claim 2, the operations further comprising using regular expressions, by the information model to detect that the sensitive information is included in the at least one electronic file.

4. The method of claim 2, the operations further comprising, providing the user a mechanism to provide feedback when the information model indicates that the sensitive information is included in the at least one electronic file.

5. The method of claim 1, the operations further comprising preventing the user, via the browser extension, from connecting to the cloud service until download or upload has been corrected.

6. The method of claim 1, the operations further comprising quarantining, via the browser extension, the at least one electronic file such that the at least one electronic file cannot be opened.

7. The method of claim 1, wherein the cloud service is accessed via the web browser.

8. The method of claim 1, the operations further comprising displaying the instructions on how the at least one electronic file with the sensitive information can be corrected in a pop-up text box.

9. The method of claim 1, the operations further comprising preventing in real-time a transmission of the at least one electronic file from spreading further downstream from the cloud service or the web browser.

10. The method of claim 1, wherein the user is a financial services account agent.

11. A sensitive information protection system, comprising:

a processor coupled to a memory that includes instructions that, when executed by the processor, cause the processor to perform operations for finding sensitive information, the operations comprising:

displaying a web browser on a computer display that permits a user to connect to a cloud;

detecting, with a browser extension associated with the web browser, a navigation to the cloud;

monitoring, with the browser extension, at least one electronic file that is to be transferred between the cloud and the web browser by monitoring packets transferring between the cloud and the web browser and recognizing one or more packets as part of the at least one electronic file;

detecting, via a federated machine learning model, that the at least one electronic file includes the sensitive information by considering unstructured data associated with the at least one electronic file; and providing, via the computer display, a popup to the user of the web browser that the sensitive information has been moved between the cloud and the web browser and preventing entering any further data until the user rectifies the sensitive information.

12. The system of claim 11, the operations further comprising invoking an information model to detect if the at least one electronic file includes the sensitive information.

13. The system of claim 12, the operations further comprising using regular expressions, by the information model, to detect that the sensitive information is included in the at least one electronic file.

14. The system of claim 12, the operations further comprising, providing for the user to provide feedback that the sensitive information is included in the at least one electronic file when the information model indicates that the sensitive information was downloaded or uploaded.

15. The system of claim 11, the operations further comprising preventing the user, by the browser extension, from connecting to the cloud until download or upload has been corrected.

16. The system of claim 11, the operations further comprising quarantining, via the browser extension, the at least one electronic file such that the at least one electronic file cannot be opened.

17. The system of claim 11, wherein the cloud is accessed via an application.

18. The system of claim 11, the operations further comprising displaying the instructions on how the at least one electronic file with the sensitive information can be corrected in a pop-up text box.

19. The system of claim 11, the operations further comprising preventing in real-time a transmission of the at least one electronic file from spreading further downstream from the cloud or the web browser.

20. A computer-implemented method, comprising:

detecting, with a browser extension associated with a web browser, a connection to a cloud service based on an activation of an application;

monitoring, with the browser extension, at least one electronic file that is to be transferred between the cloud service and the web browser;

detecting, via a federated machine learning model, that the at least one electronic file includes sensitive information by considering unstructured data associated with the at least one electronic file;

quarantining, via the browser extension, the at least one electronic file to protect the sensitive information that has been moved between the cloud service and the web browser; and adapting the connection by implementing a timeout during which uploads or downloads are prevented.

* * * * *